Patented June 24, 1930

1,765,667

UNITED STATES PATENT OFFICE

AAGE GUSMER, OF WOODBRIDGE, NEW JERSEY

PROCESS FOR THE TREATMENT OF BEVERAGES

No Drawing.   Application filed July 29, 1925. Serial No. 46,887.

My invention relates to the treatment of beverages. More particularly, my invention relates to the treatment of beverages containing natural or artificial ferments. Specifically, my invention is concerned with the treatment of cereal beverages preferably under a vacuum with free or uncombined sulfur dioxid in gaseous form whereby the quality of the resulting product is greatly improved.

My invention relates more particularly to the treatment of cereal beverages which conform to the present United States laws covering the manufacture of intoxicating liquors. It is well known that in the production of a cereal beverage, such as is commonly known as near-beer, it is necessary to first produce a beer which has an alcoholic content of about 3% by weight. The excess alcohol, which is the amount of alcohol above one-half of one per cent by volume, this being the amount allowable according to the present Volstead Act, is removed from the beer in order to make it comply with the present laws of the United States, by boiling either in an open kettle or under vacuum. In this boiling operation, particularly in an open kettle, caramelization takes place. The caramelization produces a darker product. Further, the removal of the alcohol affects the sterility, or keeping qualities of the beverage, and the beverage will not keep as long after the alcohol is removed as it would if the alcohol had not been removed, due to the fact that microorganisms will multiply very rapidly in a beverage which contains only a small amount of alcohol.

In the practice of my improved process, I find that it is desirable to introduce the sulfur dioxid into the dealcoholizing kettle, particularly when the dealcoholization is carried out in an open kettle at the time when the excess alcohol has been removed, and just about the time the body increasing material for instance saccharides and water are added to bring up the beverage to its original volume and Balling. The body saccharides referred to may include the dextrines which may comprise achroo-dextrine and malto-dextrine. As indicated these saccharides function to give body, as well understood in the art, to the beverage and in addition, when added as indicated in my disclosure produce the results specified. I find that it is good practice to use liquid sulfur dioxid, inasmuch as this is the most convenient form in which it can be purchased. Liquid sulfur dioxid is converted into gaseous sulfur dioxid as soon as the pressure is released, and this is at the point at which I intimately mix the sulfur dioxid with the beverage to be treated. I find that it is good practice to use from twenty (20) to thirty-five (35) pounds of liquid sulfur dioxid to the remainder of the beverage resulting from starting with 400 barrels and boiling approximately three to six hours, or until the alcohol has been reduced to less than one-half of one per cent. The remaining volume amounts to about 75% of the original volume. I find it is good practice to introduce the sulfur dioxid, the water, and the body sugars to the evaporated beverage at the same time, and boil this mixture for one hour. The reaction of the sulfur dioxid is practically instantaneous. The reaction changes the character of the beverage, inasmuch as the color is considerably lightened. Therefore, the amount of sulfur dioxid required depends on the degree of paleness desired. The sulfur dioxid further checks effectively the growth of such micro-organisms as might be present.

I find that the action of sulfur dioxid in an uncombined state is more powerful than in a combined state. I further find that the saturation of the beverages, particularly under a vacuum is very advantageous, and a very complete impregnation, saturation, and mixing of the beverage occurs.

I have found that my process is highly desirable because of the fact that no salts are used which might leave deleterious tastes or increase the ash content of the beverage. I further find that a smaller amount of sulfur dioxid is required, and thus my process is more economical. I further find that any excess of sulfur dioxid is driven off in the one hour's boiling by the use of my process. I further find that sulfur dioxid in addition to the bleaching effect, has a quite desirable effect of preserving the beverage, and that the beverage remains sterile and does not become sour over a much longer period than it would if it was not treated with sulfur dioxid. The sulfur dioxid besides its preserving effect has an affinity for oxygen. The absorption of the oxygen is desirable as most of the bacteria and ferments which cause the well known disturbances are aerobic and cannot propagate without the aid of oxygen. The undesirable bacteria includes acetic acid bacteria, slime yeasts, mold, penicillium glaucum and micrococcus malolacitious which has ability to change certain natural organic acids into lactic acid, which under certain conditions is undesirable in edible juices. Furthermore, the affinity of sulfur dioxid for oxygen produces sulfuric acid which is present during the growth of the yeast.

My invention is not limited in its application to the fermented beverage as outlined above, but liquid sulfur dioxid may be added to the malt wort at a much earlier stage, namely, at the time when it is brewed just after being run from the cooling apparatus. It is customary when the beer wort leaves the cooling apparatus to start its fermentation with pure yeast, and if the sulfur dioxid is added just previous to that point, it will have the effect described previously, of bleaching the malt wort, and at the same time prevent it from being infected. The sulfur dioxid will however, not have any deleterious effect on the alcohol fermentation which takes place after the yeast starts working, but will tend to strengthen the growth of the yeast, inasmuch as it is assimilated in part by the yeast cells. The excess sulfur dioxid will be driven off by the gases which are formed during alcoholic fermentation, but some will remain in the fermented wort which, on account of the effect of the sulfur dioxid, will go through absolutely pure fermentation and will keep during the customary storage period, which may be a long period under present conditions. The reason for this is the fact that the low alcoholic beers which are being sold at present are principally marketed during the summer period. When climatic conditions are not favorable, considerably less quantities may be consumed than anticipated making necessary the carrying over of alcoholic beverage ready for dealcoholization for an extended period. Thus the use of my process results in the production of a pure malt beverage which will keep pure under the abnormal conditions at present prevailing in the breweries and is also of great importance on this account.

It is also customary to keep the malt beverage for some time before it is started with pure yeast, and it has been found that the addition of sulfur dioxid makes the malt wort practically sterile. Furthermore, such malt worts are frequently evaporated in vacuum in order to produce malt extracts for baker's yeast. It is desired to have such malt extracts very pale in color in order to produce the customary white loaf bread which the American public demands. The malt wort when treated with the sulfur dioxid as outlined in my process, will produce a much paler extract than otherwise.

In the practice of my improved process, I have found that when the beverage is confined under a vacuum as low as five inches of mercury satisfactory results have been obtained. This corresponds roughly to an absolute pressure of a little over twelve pounds per square inch. It is obvious that this vacuum may be varied considerably and the above is merely illustrative of a suitable vacuum and not a limitation strictly to be adhered to.

As indicated, the process may be applied to either fruit beverages or cereal beverages. Beverages of the character set forth may be pasteurized by treatment with sulfur dioxid, preferably, confining the beverage under a vacuum. It is good practice where beverages have natural ferments to heat to pasteurization temperatures prior to propagating with pure yeast or other ferments. This propagation is advisable when higher attenuation or different flavors are desired which cannot be produced when an ordinary type of yeast is used. Juices of the character set forth may be pasteurized by my process and in this pasteurization treatment, it is not necessary to heat the juices. Furthermore, fermentation is not retarded when the necessary quantity of yeast is added.

I claim:—

1. The process of treating a beverage of cereal or fruit origin containing alcohol in excess of that specified by the National Prohibition Act comprising removing the excess of alcohol by heat treatment so that the quantity remaining in the beverage is non-violative of said act and thereafter simultaneously adding sulphur dioxide and body increasing material to the beverage while the same is confined under a vacuum and then boiling to at least partially eliminate the sulphur dioxide.

2. The process of treating a beverage prepared from cereal matter containing alcohol in excess of that specified by the National Prohibition Act comprising removing the excess of alcohol by heat treatment under a vacuum so that the quantity remaining in the beverage is non-violative of said act, and then introducing free sulphur dioxide and body increasing material into said beverage while maintaining the latter under a vacuum.

3. The process of treating a beverage of cereal or fruit origin containing alcohol in excess of that specified by the National Prohibition Act comprising removing the excess of alcohol by heat treatment so that the quantity remaining in the beverage is non-violative of said act and thereafter adding simultaneously sulphur dioxide, water and body increasing material to bring the beverage up to substantially its original body and boiling the mixture, the entire operation being carried out in the absence of any carbonation step.

4. The process of treating a beverage of cereal or fruit origin containing alcohol in excess of that specified by the National Prohibition Act comprising removing the excess of alcohol by heat treatment so that the quantity remaining in the beverage is non-violative of said act and thereafter adding simultaneously sulphur dioxide, water and body increasing material to bring the beverage up to substantially its original body and boiling the mixture for one hour, the entire operation being carried out in the absence of any carbonation step.

5. The process of treating a beverage of cereal or fruit origin containing alcohol in excess of that specified by the National Prohibition Act, comprising boiling the beverage until the quantity of alcohol remaining in the beverage is non-violative of said act, substantially immediately adding to said beverage sulphur dioxide and body sugars, and continuing the boiling.

6. In the treatment of malt material containing alcohol in excess of that specified by the National Prohibition Act, the steps of boiling the malt material until the quantity of alcohol remaining therein is non-violative of said act, substantially immediately adding to said malt material sulfur dioxid and body sugars, and continuing the boiling.

7. In the treatment of malt material containing alcohol in excess of that specified by the National Prohibition Act, the steps of boiling the malt material until the quantity of alcohol remaining therein is non-violative of said act, substantially immediately adding to said malt material sulfur dioxid and body sugars, and continuing the boiling, the entire treatment being carried out under a vacuum.

In testimony that I claim the foregoing as my invention, I have signed my name hereto.

AAGE GUSMER.